United States Patent [19]

Hoxmeier et al.

[11] Patent Number: 5,693,713
[45] Date of Patent: Dec. 2, 1997

[54] PROCESS FOR MAKING BLOCK GRAFT COPOLYMERS BY GRAFTING HALOSILANES ONTO POLYOLEFIN/DIENE POLYMERS

[75] Inventors: Ronald James Hoxmeier; Bridget Ann Spence; Robert Charles Job, all of Houston, Tex.

[73] Assignee: Shell Oil Company, Houston, Tex.

[21] Appl. No.: 453,241

[22] Filed: May 30, 1995

[51] Int. Cl.$^6$ .................... C08L 53/00; C08L 51/00
[52] U.S. Cl. .................... 525/102; 525/105; 525/250; 525/271; 525/342; 525/254; 525/276; 525/292; 525/314
[58] Field of Search .................. 525/102, 105, 525/250, 271, 342, 254, 276, 292

[56] References Cited

U.S. PATENT DOCUMENTS

| | | | |
|---|---|---|---|
| 3,627,837 | 12/1971 | Webb | 525/108 |
| 3,700,638 | 10/1972 | Kawasaki et al. | 526/97 |
| 3,703,566 | 11/1972 | Duck et al. | 525/250 |
| 3,786,116 | 1/1974 | Mickovich et al. | 525/276 |
| 3,842,059 | 10/1974 | Milkovich et al. | 525/292 |
| 3,862,098 | 1/1975 | Milkovich et al. | 525/292 |
| 3,879,494 | 4/1975 | Milkovich et al. | 525/85 |
| 3,894,119 | 7/1975 | Forbes et al. | 525/241 |
| 3,925,511 | 12/1975 | Loveless | 525/272 |
| 4,078,019 | 3/1978 | Langer, Jr. | 526/180 |
| 4,168,921 | 9/1979 | Blanchard | 403/19 |
| 4,424,308 | 1/1984 | Shannon | 525/196 |
| 4,500,648 | 2/1985 | Malpass | 502/115 |
| 4,581,467 | 4/1986 | Malpass | 556/170 |
| 4,707,521 | 11/1987 | Esneault et al. | 525/250 |
| 4,761,456 | 8/1988 | Lund et al. | 525/331.7 |
| 4,786,689 | 11/1988 | Lund et al. | 525/250 |
| 4,794,145 | 12/1988 | Lund et al. | 525/250 |
| 4,851,489 | 7/1989 | Malpass | 526/153 |
| 4,853,436 | 8/1989 | Ohata et al. | 525/244 |
| 5,037,890 | 8/1991 | Yokoyama et al. | 525/250 |
| 5,045,597 | 9/1991 | Asanuma et al. | 525/72 |
| 5,081,190 | 1/1992 | Asanuma et al. | 525/288 |
| 5,104,952 | 4/1992 | Babu | 526/279 |
| 5,118,768 | 6/1992 | Job et al. | 526/124 |
| 5,122,494 | 6/1992 | Job | 502/125 |
| 5,159,023 | 10/1992 | Cecchin et al. | 525/250 |
| 5,162,445 | 11/1992 | Powers et al. | 525/333.4 |
| 5,192,616 | 3/1993 | Babu | 428/407 |
| 5,227,426 | 7/1993 | Tse et al. | 524/534 |
| 5,266,648 | 11/1993 | Masse | 525/314 |
| 5,272,236 | 12/1993 | Lai et al. | 526/348.5 |
| 5,278,272 | 1/1994 | Lai et al. | 526/348.5 |
| 5,294,678 | 3/1994 | Tse et al. | 525/319 |
| 5,380,810 | 1/1995 | Lai et al. | 526/352 |

FOREIGN PATENT DOCUMENTS

| | | |
|---|---|---|
| 0416815 A2 | 3/1991 | European Pat. Off. . |
| 1167521 | 11/1966 | United Kingdom . |
| 91/04995 | 4/1991 | WIPO . |
| 92/12190 | 7/1992 | WIPO . |
| 94/07930 | 4/1994 | WIPO . |

OTHER PUBLICATIONS

D. J. Peterson, *Journal of Organametallic Chemistry*, vol. 9, pp. 373 & 374, 1967.

J. C. Faulk et al., *Journal of Macromolecular Science—Chemistry*, A (7)(8), pp. 1663–1668, 1973.

D. B. Collum, Accts. Chem. Res., vol. 25, pp. 448–454, 1992.

*Primary Examiner*—Mark L. Warzel
*Attorney, Agent, or Firm*—Donald F. Haas

[57] ABSTRACT

A method of producing graft block copolymers which comprises (a) grafting a halosilane of the formula $$HSiX_nR_{3-n}$$

wherein X is halogen, R is alkyl or aryl, and n=1–3, onto a α-olefin/diene copolymer made from at least one α-olefin and at least one diene, (b) anionically polymerizing at least one anionically polymerizable monomer to form living polymer chains, and (c) reacting the products of (a) and (b) together wherein the living polymer chains react with the halosilane groups on the α-olefin/diene copolymer and are added thereto as pendant side chains.

21 Claims, No Drawings

PROCESS FOR MAKING BLOCK GRAFT COPOLYMERS BY GRAFTING HALOSILANES ONTO POLYOLEFIN/DIENE POLYMERS

BACKGROUND OF THE INVENTION

This invention relates to a method for making block graft copolymers. More particularly, the present invention is a process for making block graft copolymers having polyolefin/diene backbones.

Anionic polymerization utilizing organo alkali metal initiators has long been used to polymerize conjugated diolefins such as butadiene and isoprene and to copolymerize such diolefins with styrenes and substituted styrenes to make styrene-butadiene-styrene and styrene-isoprene-styrene linear block copolymers and similar linear block copolymers. This reaction is usually carried out in an inert hydrocarbon solvent such as cyclohexane or toluene and it is necessary to rigorously exclude oxygen, water or any impurity that can react with a highly reactive propagating species. Under these conditions, the polymeric molecular weights and block structure can be precisely controlled.

It would be advantageous to be able to make graft block copolymers from alpha olefins and dienes because of the wide range of monomers available allowing tailoring of properties to fit the desired application. The present invention provides a method for making graft block copolymers from conventional polymers such as EPDM (ethylene-propylene-diene terpolymer) or polyolefin polymers made by the relatively inexpensive Ziegler-Natta polymerization process.

SUMMARY OF THE INVENTION

The present invention provides a process of producing graft block copolymers which comprises (a) grafting a halosilane of the formula

$$HSiX_nR_{3-n}$$

wherein X is a halogen, preferably chlorine, R is alkyl or aryl, and n is an integer from 1 to 3, onto a copolymer made from at least one alpha olefin and at least one diene, (b) anionically polymerizing at least one anionically polymerizable monomer to form living polymer chains, and (c) reacting the grafted polymer of (a) and the living polymer chains of (b) together wherein the living polymer chains react with the halosilane groups on the grafted polymer and are added thereto as pendant side chains.

In a preferred embodiment, the elastomeric polymer is EPDM. In another embodiment, the graft block copolymer is made by copolymerizing at least one alpha olefin which preferably is not a diene with at least one diene in the presence of a titanium/aluminum catalyst. The anionic monomer is preferably styrene, but methacrylate, butadiene, isoprene, or mixtures of two or more may be used. The present invention also includes a graft block copolymer with pendent anionic polymer side chains made by this process.

DETAILED DESCRIPTION OF THE INVENTION

The first step of this process involves grafting by hydrosilation of a halosilane onto the copolymer to form the backbone of the graft block copolymer of the present invention. This reaction may be carried out using well known free radical hydrosilation grafting technology. Another method of carrying out this step of the process is hydrosilation via a metal catalyst, for example, organometallic Pt complexes such as a Pt-divinyltetramethyldisiloxane complex (from Hüls-Petrarch).

The copolymer must contain some unsaturation for it to be able to react with the halosilane. These copolymers contain at least one alpha olefin monomer type and at least one diene monomer type. The α-olefin preferably is not a diene. Almost any α-olefin can be used in the practice of this invention but it is preferred that the α-olefin be a $C_2$ to $C_{12}$ olefin, such as ethylene, propylene, butene, hexene, octene, decene, dodecene, etc. Suitable dienes include those dienes containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene, 1,7-octadiene, 1,4-hexadiene, and the like.

In general, any α-olefin can be used in the practice of this invention but it is preferred that the α-olefin be a $C_2$ to $C_{30}$ olefin. The choice of α-olefin will depend on the intended application for the product graft block copolymer. If a soft, thermoplastic elastomer is desired, then the graft block copolymer will be composed of an amorphous polymer backbone and glassy or semicrystalline polymer grafts. In this case, it is preferred that the α-olefin be a $C_4$ to $C_{30}$ olefin or a mixture of $C_2$ to $C_{30}$ olefins. These olefins are preferred because they invariably produce amorphous materials with relatively low glass transition temperatures ($T_g$). When graft block copolymers are produced from these olefinic backbones and glassy or semicrystalline anionic polymer grafts as described above, the low $T_g$ of the polyolefin provides for retention of elastomeric properties of the graft block copolymer down to low temperatures and a broad service temperature range. $C_4$ to $C_{16}$ α-olefins and mixtures thereof are preferred because they produce soft, tacky amorphous polymer.

If a tough, impact resistant plastic is desired composed of an amorphous polymer backbone and glassy or semicrystalline polymer grafts in which the weight fraction of the grafts is greater than about 0.50, then an α-olefin that produces an amorphous polymer will again be chosen. It is preferred that the α-olefin be a $C_4$ to $C_{30}$ olefin or a mixture of $C_2$ to $C_{30}$ olefins because the low $T_g$ of the product polymer will allow the graft block copolymer to retain ductile behavior of the dispersed phase down to low temperatures and a broad service temperature range. If a tough, impact resistant plastic is desired composed of a glassy or semicrystalline polymer backbone and amorphous polymer grafts then α-olefins that produce a glassy or crystalline polymer will be chosen. In this case, it is preferred that the α-olefin be a $C_2$ to $C_5$ olefin. If a stiff plastic material is desired then α-olefins that produce a glassy or semicrystalline polymer will be chosen. In this case, it is preferred that the α-olefin be a $C_2$ to $C_5$ olefin.

The α-olefin/diene copolymer may be made separately as part of this process. This polymerization step is preferably carried out by using a Ziegler-Natta polymerization process.

Methods for carrying out the copolymerization of the α-olefin and the diene include the use of metallocene and Ziegler-Natta catalysis as well as cationic polymerization. Metallocene catalysts are organometallic coordination compounds obtained as a cyclopentadienyl derivative of a transition metal or metal halide. Their use in the polymerization of olefins is well known.

A useful Ziegler-Natta catalysis process is described in U.S. Pat. No. 5,045,597 which is herein incorporated by reference. The Ziegler-Natta method of polymerization requires the presence of a catalyst which includes a transition metal compound and which also utilizes an aluminum compound as well as an electron donor. Such transition metal compounds include titanium halides such as titanium trichloride and titanium tetrachloride as well as magnesium chloride supported titanium tetrachloride, magnesium alkoxide supported titanium tetrachloride and certain metallocenes of zirconium, titanium, and hafnium which are known from the art to polymerize α-olefins. The aluminum compound is usually an organo aluminum compound which is preferably selected from the group consisting of trialkyl aluminum, dialkyl aluminum halides, alkyl aluminum sesquihalides and alkyl aluminum dihalides, and aluminoxanes. There are a wide variety of electron donors which can be used and they are usually oxygen or nitrogen containing compounds such as ethers, esters, ortho ethers, alkoxysilicon compounds, and heterocyclic aromatic nitrogen compounds.

The Ziegler-Natta polymerization may be conducted in neat monomer, by solvent polymerization, or by vapor phase polymerization. Generally, polymerization is conducted at a temperature of from 30° C. to 100° C. under a pressure of from atmospheric to the vapor pressure of the monomer which has the lower vapor pressure at the polymerization temperature and optionally in the presence of a molecular weight control agent such as hydrogen.

If a soft, thermoplastic elastomer or a tough, impact resistant plastic composed of an amorphous polymer backbone and glassy or semicrystalline polymer grafts as described above is desired, then it is important that the catalyst which is chosen is one which tends to produce amorphous polymers. Such catalysts are described in U.S. Pat. Nos. 5,122,494, 5,188,767, 5,089,573, 5,118,768, 4,874,737, 4,971,936, and 5,229,477, which are all herein incorporated by reference. A preferred catalyst for use herein is described in U.S. Pat. No. 5,122,494. The catalyst is formed by contacting, in the presence of an inert diluent, an alkyl aluminum halide halogenating agent with a complex magnesium-containing, titanium-containing alkoxide compound prepared by reaction of magnesium alkoxide, titanium tetraalkoxide and a phenolic compound. The complex alkoxide compounds are of somewhat variable stoichiometry but have the general illustrative formula

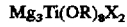

wherein R independently is alkyl of up to four carbon atoms inclusive and X independently is a monovalent anion derived from a phenolic compound as described below. The diluent is then removed to produce, as a particulate solid, the complex alkoxide compound. This solid is treated with alkyl aluminum halide to produce the olefin polymerization catalyst.

The preferred alkoxides are magnesium ethoxide and titanium tetra ethoxide. The phenolic compound is selected from phenol or an activated phenol (a monohydroxylic phenol of one aromatic ring having aromatic ring substituents other than hydrogen which serve to alter the pKa of the phenolic compound). Suitable phenolic compounds are phenol, o-cresol, and 2,6-di-t-butyl-4-methylphenol (BHT).

As described above, the halosilane compounds described by the formula set out above are then grafted onto the copolymer produced by the polymerization of the α-olefin and the diene. The halosilane compounds which can be used in the present invention include any of the silanes described by the above formula. Especially preferred halosilanes include trichlorosilane ($SiHCl_3$), dimethylchlorosilane ($SiHCl(CH_3)_2$), phenyldichlorosilane, and methydichlorosilane ($SiHCl_2CH_3$). Dimethylchlorosilane is preferred because only one potential grafting site per silicon atom is available and, because it has such a low boiling point, the unreacted silane can be readily removed from the polymer.

Any anionically polymerizable monomer should be effective in being grafted to the elastomeric copolymer backbone according to this invention. Particular monomers which can be used include acryl amides, acrylonitriles, nitrobutene, vinylisocyanate, anhydrides, methacrylates, including methyl methacrylate, alkyl and aryl acrylates, vinyl pyridines, carbodiimides, lactams, dienes, styrene and styrene derivatives including alkylstyrenes, halogenated methoxy styrenes and nitrostyrene, as well as 1,3 pentadiene, 1,3-octadiene, ethylene, and hexamethyltrisiloxane.

As is well known, polymers containing ethylenic unsaturation or both aromatic and ethylenic unsaturation may be prepared using anionic initiators or polymerization catalysts. Such polymers may be prepared using bulk, solution or emulsion techniques.

In general, when solution anionic techniques are used, anionically polymerizable polymers including conjugated diolefin polymers, alkenyl aromatic hydrocarbons, and copolymers of conjugated diolefins and alkenyl aromatic hydrocarbons are prepared by contacting the monomer or monomers to be polymerized simultaneously or sequentially with an anionic polymerization initiator. Such initiators include Group IA metals, their alkyls, amides, silanolates, napthalides, biphenyls and anthracenyl derivatives. It is preferred to use an organoalkali metal compound in a suitable solvent at a temperature within the range from about −150° C. to about 300° C., preferably at a temperature within the range from about 0° C. to about 100° C. Particularly effective anionic polymerization initiators are organolithium compounds having the general formula:

$$RLi_n$$

Wherein:

R is an aliphatic, cycloaliphatic, aromatic or alkyl-substituted aromatic hydrocarbon radical having from 1 to about 20 carbon atoms; and n is an integer of 1 to 4.

Dienes which may be polymerized anionically include those dienes containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Dienes containing from 4 to about 8 carbon atoms are preferred for use in such polymers. Alkenyl aromatic hydrocarbons which may be copolymerized include vinyl aryl compounds such as styrene, various alkyl-substituted styrenes, alkoxy-substituted styrenes, 2-vinyl pyridine, 4-vinyl pyridine, vinyl naphthalene, alkyl-substituted vinyl naphthalenes and the like.

In general, any of the solvents known in the prior art to be useful in the preparation of such polymers may be used. Suitable solvents, then, include straight- and branched-chain hydrocarbons such as pentane, hexane, heptane, octane and the like, as well as, alkyl-substituted derivatives thereof; cycloaliphatic hydrocarbons such as cyclopentane, cyclohexane, cycloheptane and the like, as well as, alkyl-substituted derivatives thereof; aromatic and alkyl-substituted derivatives thereof; aromatic and alkyl-substituted aromatic hydrocarbons such as benzene, naphthalene, toluene, xylene and the like; hydrogenated aromatic hydrocarbons such as tetralin, decalin and the like; linear and cyclic ethers such as methyl ether, methyl ethyl ether, diethyl ether, tetrahydrofuran and the like; ketones such as methyl ketone (acetone), methyl ethyl ketone, ethyl ketone (3-pentanone) and the like.

Also useful herein are acrylic monomers, especially including those with the structure

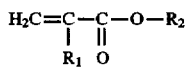

where $R_1$ is hydrogen, phenyl or an alkyl radical which is linear or branched and has from 1 to 10 carbon atoms and $R_2$ is an alkyl radical which is branched at the first carbon atom, has from 1 to 14 carbon atoms, may contain a tertiary amine or an ether linkage and may be a cyclic hydrocarbon. This provides the polymer with strongly reactive and interactive chemical groups. In the formula above, it is important that $R_2$ be branched at the first carbon because branching makes the monomer easier to polymerize. An example is t-butyl. More specifically, polymer chains which may be used according to the present invention are polymer chains which include acrylic monomers of the formula described above such as alkyl methacrylates or derivatives of alkyl methacrylates such as hydrolyzed alkyl methacrylates or anhydride derivatives thereof. Other suitable acrylic monomers include acrylates, such as t-butyl acrylate; cyclic alkyl methacrylates, such as 2,5-dimethylcyclohexyl methacrylate; and acrylates in which the alkyl group contains an ether linkage, such as tetrahydrofuran acrylate.

The polymerization of the anionically polymerized monomers is not ended by the addition of chain terminating agents such as alcohols or hydrogen. It is very important that living anionically polymerized polymer chains remain to be reacted with the halosilane grafted copolymer in the third step of the process of the present invention. By living polymer chains it is meant that the polymerization initiator is still a part of the polymer chain and is active and available for further polymerization if more monomer becomes available. In this case, the polymerization is ended when the monomer supply is exhausted. For example, when polystyrene is polymerized and an organo lithium compound is used as the initiator, the living polymer chain can be represented as:

This is known as polystyryl lithium.

The composition of the final product will be determined, of course, by the selection of the halosilane, the copolymer to which the halosilane is grafted, the composition of the anionic polymer side chains, and the amounts of each which are reacted. In order to obtain an elastomeric product, the amount of glassy of hard side chains relative to the amount of amorphous material (in the copolymer backbone and the side chains) must be such that an amorphous matrix with dispersed hard segments will be formed leading to a microphase separated elastic network.

When a thermoplastic elastomer with substantial strength is desired, it is important to control the number of pendent anionic polymer side chains. If there are, on average, less than 2 side chains per backbone polymer, then the resulting graft block copolymer will have low strength. The number of side chains is controlled by the number of halosilane groups on the backbone copolymer and the ratio of graft and backbone polymer chains. It is highly preferred that the graft block copolymer contain, on average, from 2 to 200 pendent anionic polymer side chains per backbone polymer so long as these pendent groups do not exceed 50% by wt. of the total composition. This is preferred because when the graft block copolymers contain greater than 50% w anionic polymer side chains, the glassy or semicrystalline graft polymer become the matrix with dispersed amorphous backbone polymer and the resulting graft block copolymer is no longer elastomeric, but will behave like a toughened plastic.

Such polymers of the present invention are excellent thermoplastic elastomers. For example, they have the following properties: they can be compression molded and the resulting polymer films undergo high elongation under tensile stress, this deformation being recovered after the stress is removed.

These thermoplastic elastomers made according the present invention have an extremely wide variety of uses. They may be used in all of the applications for which other thermoplastic elastomers have been used. For example, other thermoplastic elastomers are useful in adhesives, sealants, coatings, polymer modification (blending with other thermoplastic polymers such as polyolefins, polycarbonate, polyphenyleneoxide, etc. to enhance or alter the properties thereof), asphalt modification, viscosity index improvers, polymer blend compatibilization, impact modification of engineering thermoplastics, molded and extruded goods, tie layers, and blown and extruded films. Block graft copolymers which are tough, impact resistant plastics or stiff plastics may be used in molded and extruded goods, fibers, films, polymer modification, polymer blend compatibilization and tie layers. The polymers may also be crosslinked to provide additional strength and environmental, chemical, and thermal resistance.

EXAMPLES

Example 1

Hydrosilylation with Pt Complexes

1.A. 57 grams of a copolymer of 9% cis-1,4-hexadiene with 1-hexene was dissolved in 190 grams of dry cyclohexane by shaking overnight at ambient temperature. 150 mg of a 3-3.5% xylene solution of platinum-divinyltetramethyldisiloxane complex (Purchased from Hüls/Petrarch) was stirred into the polymer solution and then 3.14 grams of chlorodimethylsilane (diluted with 7 grams of cyclohexane) was added and the mixture returned to the shaker. After shaking overnight at ambient temperature, another 2.5 grams of chlorodimethylsilane was stirred into the pale yellow solution. The mixture was heated to 65° C. for 20 minutes then returned to the shaker. After shaking overnight, another 120 grams of cyclohexane was added and the solution boiled to remove the unreacted chlorodimethylsilane. The result was a 27% solution of the silylated polymer.

1.B. The reaction was repeated with trichlorosilane replacing chlorodimethylsilane.

1.C. The reaction was repeated with dimethylchlorosilane.

Three grams of each sample was dissolved in 50 grams of cyclohexane and left overnight. Any gel that formed was filtered out.

In a separate vessel, a living polystyrene polymer of 5000 molecular weight was made by reacting 9 grams of styrene in the presence of 1.8 millimoles of sec-butyllithium at 50° C. for 30 minutes in 81 grams of cyclohexane. A 10 percent solids polymer cement of the living polymer in cyclohexane was formed.

Thirty grams of the living polystyrene polymer cement (containing 3 grams of the living polymer) was added to each container of the silanated elastomeric copolymer samples. 1000 parts per million of ethylene glycol diethyl ether was added and the reaction was allowed to take place for 60 minutes at 70° C. It was terminated by addition of isopropyl alcohol. The resulting polymer cement was coagulated into 600 milliliters of dimethylketone. The polymer was dried in a vacuum oven overnight at 75° to 80° C. The grafted polystyrene block molecular weights were determined by Gel Permeation Chromatography on the final product which contained some unreacted polystyrene, which, due to the nature of the synthesis, must have the same molecular weight as the polystyrene which reacted with the halosilane grafted copolymer. The polystyrene content in the final product was determined by NMR. The results are shown in Table I.

Example 2

Hydrosilylation With 2,2'-azobis(2-methyl-butanenitrile) [VAZO-67]

2.A. 6.9 grams of Nordel-1320 EPDM (purchased from duPont, nominally containing 2.1 mmol of 1,4-hexadiene olefin terminii) were dissolved in 108.6 grams of dry cyclohexane by shaking overnight at ambient temperature. 77 milligrams of 2,2'-azobis(2-methylbutanenitrile) (tradename VAZO-67, purchased from dupont, 0.4 mmol) and 0.40 gram of dimethylchlorosilane (4.2 mmol) were added and the solution stirred overnight in a 66° C. oil bath. 30 grams of cyclohexane was added and the oil bath temperature increased to 96° C. so as to boil off 11 grams of solvent along with the unreacted silane. The result was a 6% solution of hydrosilated EPDM.

2.B. 6.9 grams of Nordel-1320 EPDM were dissolved in g9.2 grams of dry cyclohexane by shaking overnight at ambient temperature. 39 milligrams of 2,2'-azobis(2-methylbutanenitrile) (0.2 mmol) and 0.37 gram of phenyldichlorosilane (2.1 mmol) were added and the solution stirred overnight in a 69° C. oil bath. The oil bath temperature was increased to 85° C. and held for an hour. Because a less than stoichiometric amount of silane was used and because of the low volatility of the phenyldichlorosilane, no attempt was made to remove it by boiling. The result was a 6% solution of hydrosilated EPDM.

2.C. 6.9 grams of Nordel-1320 EPDM were dissolved in g8.5 grams of dry cyclohexane by shaking overnight at ambient temperature. 77 milligrams of 2,2'-azobis(2-methylbutanenitrile) (0.4 mmol) and 0.56 gram of trichlorosilane (4.1 mmol) were added and the solution stirred overnight in a 66° C. oil bath. 30 grams of cyclohexane was added and the oil bath temperature increased to 96° C. so as to boil off 6 grams of solvent along with the unreacted silane. The result was a 6% solution of hydrosilated EPDM.

The silanated copolymers of Example 2 were reacted with living polystyrene polymers according to the same procedure described in Example 1 with the exception of example 2C-2 which was reacted with 11 g of living polystyrene in cyclohexane solution. Results are reported in Table I for 2A, 2B, 2C and 2C-2.

TABLE I[a]

| Sample No. | PS MW (M = 1000) | PSC (%) |
|---|---|---|
| 1A | 5.1 M | 15% |
| 1B | 5.1 M | 16% |
| 1C | 5.1 M | 14% |
| 2A | 6.2 M | trace |
| 2B | 6.3 M | 1% |
| 2C-1 | 6.2 M | 2% |
| 2C-2 | 4.8 M | 3% |

[a]PSC = polystyrene content (% weight in final product) by NMR.

In all cases, the living polystyrene polymer chains were grafted onto the silanated copolymer. Sample 2A shows only a trace of polystyrene. It is believed that the reason for this is low hydrosilylation yields resulting in insufficient sites on the copolymer for reaction with the polystyryl lithium. More polystyrene was grafted onto the first series of polymers than onto the second series. It is believed that the reason for this is that Pt complexes are more efficient than VAZO-67 for hydrosilylation. However, the results clearly show that this process is effective in producing graft block copolymers with pendant side chains.

Stress/strains testing was performed on the graft block copolymers prepared from Samples 1A and 1C. The results are shown in Table II below. Elastomeric behavior is demonstrated by the high elongation and good recovery after tensile deformation.

TABLE II

| Sample No. | Ultimate Tensile Strength (psi) | Ultimate Tensile Elongation (%) | % Set (10 min. after break) |
|---|---|---|---|
| 1A | 29 | 305 | 20% |
| 1C | 103 | 494 | 25% |

We claim:

1. A method of producing graft block copolymers which comprises:

(a) grafting a halosilane of the formula

wherein X is halogen, R is alkyl or aryl, and n is an integer from 1 to 3, onto a copolymer made from at least one α-olefin and at least one diene, (b) anionically polymerizing at least one anionically polymerizable monomer to form living polymer chains, and (c) reacting the products of (a) and (b) together wherein the living polymer chains react with the halosilane groups on the α-olefin/diene copolymer and are added thereto as pendant side chains.

2. The method of claim I wherein the α-olefin/diene copolymer is made by copolymerizing at least one α-olefin and at least one diene in the presence of a titanium aluminum catalyst.

3. The method of claim 2 wherein the catalyst is comprised of:

(a) a transition metal halide-containing procatalyst component containing magnesium, transition metal halide, and an electron donor, said procatalyst component being obtained by reacting a magnesium compound of the formula MgR'R", wherein R' and R" are alkoxide groups of 1 to carbon atoms, with a halogenated transition metal compound and the electron donor; and (b) an organoaluminum cocatalyst component which contains an alkylaluminum halide.

4. The method of claim 1 wherein the anionically polymerizable monomer is a vinyl aromatic hydrocarbon.

5. The method of claim 4 wherein the vinyl aromatic hydrocarbon is styrene.

6. The method of claim 1 wherein the α-olefin/diene copolymer is EPDM.

7. The process of claim 1 wherein the α-olefin used to make the α-olefin/diene copolymer is selected from the group consisting of olefins having from 2 to 12 carbon atoms.

8. The method of claim 1 wherein the anionically polymerizable monomer is selected from the group consisting of dienes, methacrylates, acrylamides, acrylonitriles, nitrobutene, vinylisocyanate, anhydrides, methacrylates, alkyl and aryl acrylates, vinyl pyridines, carbodiimides, lactams, dienes, styrene, alkylstyrenes, halogenated methoxy styrenes and nitrostyrene, 1,3 pentadiene, 1,3-octadiene, ethylene, and hexamethyltrisiloxane.

9. The method of claim 8 wherein the anionically polymerized monomer is isoprene or butadiene.

10. The method of claim 1 wherein the halosilane is selected from the group consisting of $SiHCl_3$, $SiH(CH_3)_2Cl$, and $HSiCl_2(C_5H_6)$.

11. The method of claim 10 wherein the halosilane is $SiH(CH_3)_2Cl$.

12. The method of claim 1 wherein the hydrosilylation reaction is promoted by a platinum catalyst or a free radical initiator.

13. The product of the process of claim 1.

14. The product of the process of claim 5.

15. The product of the process of claim 6.

16. The product of the process of claim 7.

17. The product of the process of claim 9.

18. Blends of the product of claim 13 and other thermoplastic polymers.

19. A crosslinked product comprising the product of claim 13 which has been either chemically or radiation crosslinked.

20. The product of claim 13 which is comprised of an amorphous polyolefin backbone and phase-separated glassy or semicrystalline anionically polymerized grafts which comprise 50 percent by weight or less of the total polymer composition.

21. The product of claim 13 which is comprised of an amorphous polyolefin backbone and continuous glassy anionically polymerized grafts which comprise more than 50 percent by weight of the total polymer composition.

* * * * *